Figure 3:
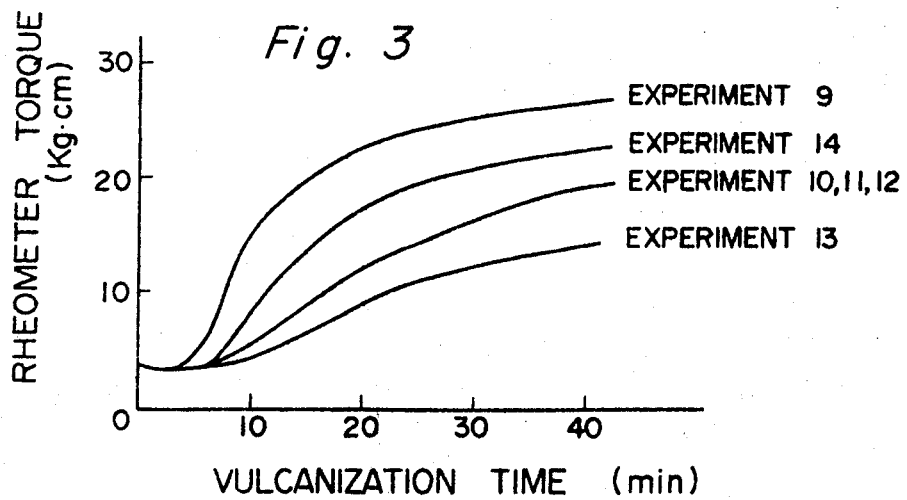

| United States Patent [19] | [11] 3,755,207 |
|---|---|
| Karatsu | [45] Aug. 28, 1973 |

[54] VULCANIZABLE EPIHALOHYDRIN POLYMER COMPOSITION

[75] Inventor: Tetsuo Karatsu, Yokohama, Japan

[73] Assignee: Nippon Zeon Co., Ltd., Tokyo, Japan

[22] Filed: Feb. 25, 1972

[21] Appl. No.: 229,381

[52] U.S. Cl. .............................. 260/2 A, 260/79 R
[51] Int. Cl. ............................................ C08g 23/20
[58] Field of Search ........................ 260/2 A, 79 R

[56] References Cited
UNITED STATES PATENTS

| | | | |
|---|---|---|---|
| 3,341,491 | 9/1967 | Robinson | 260/45.75 |
| 3,420,794 | 1/1969 | May et al. | 260/47 |
| 3,624,029 | 11/1971 | Inagami et al. | 260/45.9 R |
| 3,700,650 | 10/1972 | Hani et al. | 260/79 |

Primary Examiner—William H. Short
Assistant Examiner—Earl A. Nielsen
Attorney—Leonard W. Sherman, Edwin A. Shalloway et al.

[57] ABSTRACT

A vulcanizable epihalohydrin-polymer elastomer comprising (1) an epihalohydrin-polymer elastomer, (2) at least one metal cyanate selected from the group consisting of cyanates of matals of Groups IA, IB, IIA, IIB and IVB of the periodic table, and (3) a functional compound selected from the group consisting of (i) compounds obtained by substituting at least two hydroxyl groups or mercapto groups for hydrogen atoms in a saturated hydrocarbon molecule, (ii) compounds obtained by substituting at least one hydroxyl group and at least one mercapto group for hydrogen atoms in a saturated hydrocarbon molecule, and (iii) compounds obtained by substituting at least one hydroxyl group and for mercapto group and one amino or imino group for hydrogen atoms in a saturated hydrocarbon molecule.

11 Claims, 4 Drawing Figures

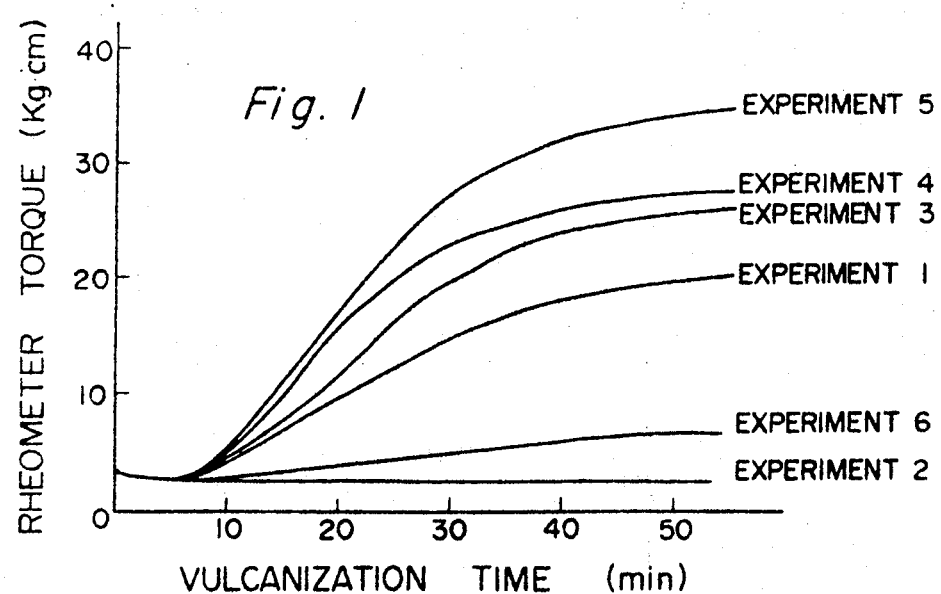
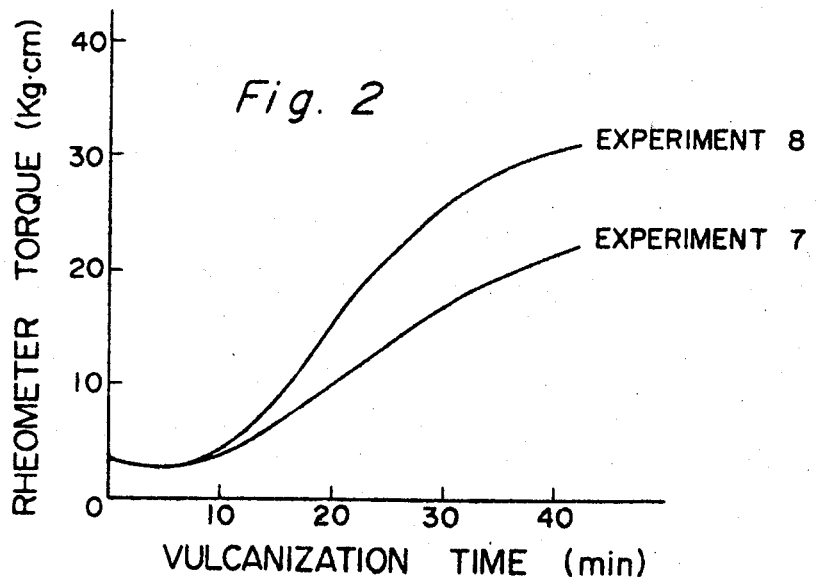

VULCANIZABLE EPIHALOHYDRIN POLYMER COMPOSITION

This invention relates to a vulcanizable composition, and more specifically, to a novel vulcanizable composition comprising an epihalohydrin-polymer elastomer.

Known methods of vulcanizing epihalohydrin polymer elastomers include a method in which 2-mercaptoimidazoline or thiourea and an oxide, organic acid salt or inorganic acid salt of a metal of Group IIA, IIB or IVB of the periodic table are conjointly used, a method wherein a polyamine is used, or a method in which an amine and sulfur or a sulfur-containing compound are used together. Various problems arise, however, partly because of the characteristics of the epihalohydrin polymer elastomer itself, when the elastomer is vulcanized by such a known method. The most serious problem lies in the marked contamination and corrosion of vulcanization dies. In addition, the blend of rubber and compounding agents frequently adheres to the mixer during the mixing operation, and the vulcanization product is difficult to release from the die. There are also the defects of insufficient thermal stability of the vulcanization product, and of the high permanent compression set of the vulcanization product. These problems are yet to be solved.

Accordingly, an object of this invention is to provide a vulcanizable epihalohydrin polymer elastomer composition which causes an extremely reduced contamination and corrosion of the die.

Another object of this invention is to provide a vulcanizable epihalohydrin polymer elastomer having superior miscibility and no appreciable adherence to the mixer in the tacky state.

Still another object of this invention is to provide a vulcanizable epihalohydrin polymer elastomer capable of giving a vulcanizate which has good die releasability, and improved thermal stability and permanent compression set.

It has been found that the above objects can be achieved in accordance with this invention by a composition comprising (1) an epihalohydrin polymer elastomer, (2) at least one metal cyanate selected from the group consisting of cyanates of metals of Groups IA, IB, IIA, IIB and IVB of the periodic table, and (3) at least one functional compound selected from the group consisting of (i) compounds obtained by substituting at least two hydroxyl groups or mercapto groups for hydrogen atoms in a saturated hydrocarbon molecule, (ii) compounds obtained by substituting at least one hydroxyl group and at least one mercapto group for hydrogen atoms in a saturated hydrocarbon molecule, and (iii) compounds obtained by substituting at least one hydroxyl group and/or mercapto groups and one amino group or imino group for hydrogen atoms in a saturated hydrocarbon molecule.

Examples of the cyanates of metals of groups IA, IB, IIA, IIB or IVB of the periodic table are cyanates of sodium, potassium, silver, barium, mercury, silicon and lead. Of these, the cyanates of sodium, potassium, and lead are especially preferred.

Examples of compound (i) having at least two hydroxyl or mercapto groups substituted for hydrogen atoms in a saturated hydrocarbon molecule include ethylene glycol, diethylene glycol, triethylene glycol, glycerol, pentaerythritol, sorbitol, ethane dithiol, propane dithiol, butane dithiol, hexane dithiol, and trithioglycerol. Typical examples of compound (ii) having at least one hydroxyl group and at least one mercapto group substituted for hydrogen atoms in a saturated hydrocarbon molecule are thioglycerol, and dithioglycerol. Examples of compound (iii) having at least one of hydroxyl group and mercapto group and/or one amino group substituted for hydrogen atoms or imino group in a saturated hydrocarbon molecule are ethanolamine, diethanolamine, 2-mercaptoethylamine, 2-mercaptopropylamine, and 1-mercapto-3-aminocyclohexane. The number of functional groups contained in compound (i), (ii), or (iii) may be at least 2, and there is no particular upper limit to this number. Usually, however, the preferred number is from 2 to 6. Functional compounds having 2 to 6 hydroxyl groups are most preferred in the present invention.

In the present invention, the conjoint use of the metal cyanate and the functional compound as a vulcanizing agent is essential. If used individually, they cannot cause the vulcanization of epihalohydrin polymer elastomers.

The epihalohydrin polymer elastomers (1) used in the present invention are homopolymer rubbers of epihalohydrins such as epichlorohydrin or epibromohydrin, copolymer rubbers of different epihalohydrins, and copolymer rubbers of epihalohydrins with other comonomers. Examples of the comonomers that can be used to prepare the copolymers include epoxides such as ethylene oxide, propylene oxide, butylene oxide, cyclohexene oxide, butadiene monoxide, ethyl glycidyl ether, allyl glycidyl ether, tetrahydrofuran and trioxane; isocyanates such as ethyl isocyanate, phenyl isocyanate and 2,4-tolylene diisocyanate; cyclic acid anhydrides such as maleic anhydride, succinic anhydride, and phthalic anhydride; acrylates; vinyl ketones; and olefins.

The amount of the vulcanizing agent that is used in the present invention varies according to the desired rate of vulcanization and degree of vulcanization. Generally, 0.5 to 15 parts by weight, usually 3 to 10 parts by weight, of the metal cyanate, and 0.1 to 10 part by weight, usually 1 to 5 parts by weight, of the functional compound, both per 100 parts by weight of the epihalohydrin polymer elastomer are used.

The vulcanizable composition of this invention can be prepared with simplicity by mixing the epihalohydrin polymer elastomer (1) with the metal cyanate (2) and the functional compound (3) as vulcanizing agents in accordance with an ordinary procedure such as roll mixing, Banbury mixing, or solution mixing. The conditions for vulcanizing this composition are not particularly restricted. Usually, the vulcanization of the composition is carried out conveniently by heating it at 120° to 180°C. for several minutes to several days. If desired, the vulcanization product can be heated for 1 hour to 3 days at 100° to 180°C.

If desired, the composition of this invention may include additional rubber compounding agents such as metal oxides, reinforcing agents, fillers, softening agents, plasticizers, antioxidants, or stabilizers. The composition of this invention which further contains as a fourth component an oxide of a metal of Group IIB or IVB of the periodic table, such as magnesia and red lead has improved properties with respect to the rate of vulcanization and the degree of vulcanization.

The epihalohydrin polymer elastomer compositions of this invention, without vulcanization, or with vulcanization in most cases, have found utility in a wide range of fields such as hoses, belts, rolls, seals, packings, gaskets, diaphragms, linings, wire coatings, plastic modifiers, or textile treating agents.

The present invention will be described specifically by the following non-limitative examples.

The accompanying FIGS. 1 to 4 are graphic representations showing vulcanization characteristic curves of the epichlorohydrin polymer rubbers obtained in the Examples which were measured by an oscillating disk rheometer.

EXAMPLE 1

The ingredients shown in Table 1 were mixed with one another by means of a 6-inch roll cooled with water.

TABLE 1

| Ingredients (parts by weight) | Runs: 1 | 2* | 3 | 4 | 5 | 6* |
|---|---|---|---|---|---|---|
| Epichlorohydrin polymer rubber** | 100 | 100 | 100 | 100 | 100 | 100 |
| Tin stearate | 2 | 2 | 2 | 2 | 2 | 2 |
| FEF carbon black | 40 | 40 | 40 | 40 | 40 | 40 |
| Sodium cyanate | 10 | 10 | 3 | 5 | 10 | 10 |
| Glycerol | 3 | — | 3 | 3 | 3 | — |
| Magnesia | — | — | 5 | 5 | 5 | 5 |

*Referential Example; **Hydrin 100 (tradename, B.F. Goodrich Co.)

In Runs Nos. 1, 3, 4 and 5 in which glycerol was compounded in accordance with the present invention, there was a reduced adhesion of the tacky blend to the roll, and it was easy to prepare the rubber blend. The vulcanization characteristics of each of the resultant rubber blends were measured at 155°C. using an oscillating disk rheometer (Toyo Seiki Co., Ltd.). This rheometer was adapted to measure the torque which is exerted on its double conical rotor when the rotor is vibrated with an angle of 3° at a speed of 3 revolutions per minute. The faster the rise of the curve drawn by the rheometer, the larger is the rate of vulcanization. Also, larger torques mean higher degrees of vulcanization. The results are shown in FIG. 1. It is seen from this figure that the vulcanizing agent used in the present invention is suitable as a vulcanizing agent for the epichlorohydrin polymer rubber. It is also noted that by using magnesia conjointly or changing the amount of sodium cyanate, the rate of vulcanization and the degree of vulcanization can be freely changed.

When sodium cyanate was used alone or in combination with magnesia, vulcanization of the composition hardly occurred.

EXAMPLE 2

The procedure of Example 1 was repeated except that the amount of glycerol in Run No. 5 of Example 1 was changed to one part by weight (Run No. 7), and 2 parts by weight (Run No. 8) to prepare rubber blends. The vulcanization characteristics of the resulting rubber blends were measured by an oscillating disk rheometer at 155°C. The results are given in FIG. 2.

EXAMPLE 3

The procedure of Example 1 was repeated except that instead of 3 parts of glycerol in Run No. 4 of Example 1, 3 parts of each of the functional compounds shown in Table 2 were used, to prepare rubber blends. The vulcanization characteristics of the resulting rubber blends were measured at 155°C. using an oscillating disk rheometer. The results are given in FIG. 3. The roll processability of each blend at the time of mixing was good.

TABLE 2

| Runs | Functional compounds |
|---|---|
| 9 | Ethanolamine |
| 10 | Ethylene glycol |
| 11 | Triethylene glycol |
| 12 | Diethylene glycol |
| 13 | Pentaerythritol |
| 14 | Thioglycerol |

EXAMPLE 4

The processability of the compounding ingredients shown in Table 3 at the time of mixing by roll, the vulcanization characteristics of the rubber blend obtained (rheometer, 155°C.), the mold releasing of the vulcanization product, the corrosive action of the vulcanization product on metal, and the physical properties of the vulcanization product were tested in accordance with JIS K-6301. The results are shown in FIGS. 3 and 4.

Figure 4:
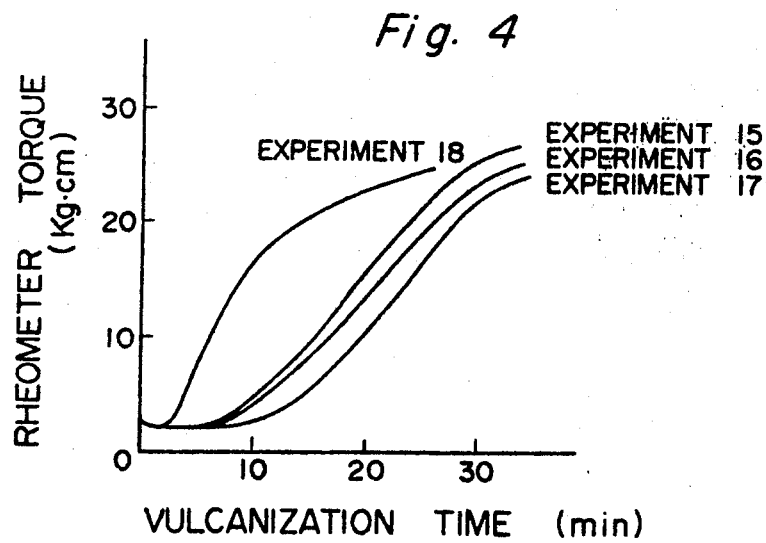

It is evident from FIGS. 3 and 4 that the vulcanization agents used in the invention provide a slightly slower rate of vulcanization than the conventional vulcanization agent in the Referential Example, but the properties of the vulcanization products are equal. Furthermore, the vulcanization agents of this invention provide excellent roll processability, mold releasing, and non-corrosive attack on metal. The composition of the invention therefore has great utility.

TABLE 3

| | Run No. 15 | 16 | 17 | 18 (Referential Example) |
|---|---|---|---|---|
| [Compounding Ingredients, parts by weight] | | | | |
| Epichlorohydrin polymer rubber (Hydrin 100) | 100 | 100 | 100 | 100 |
| Tin stearate | 2 | 2 | 2 | 2 |
| FEF carbon black | 40 | 40 | 40 | 40 |
| 2,2'-Methylenebis-(4-methyl-6-tert.-butylphenol) | 2 | 2 | 2 | 2 |
| Lead cyanate | 5 | 5 | 5 | — |
| Glycerol | 3 | 3 | 3 | — |
| 2-Mercaptobenzimidazole | — | — | 2 | — |
| Red lead | — | 5 | — | — |
| Hexamethylenediamine carbamate | — | — | — | 1 |
| [Roll Processability] | Excellent | Excellent | Excellent | Good |
| [Corrosive attack on metals]* | | | | |
| 150°C × 24 hours | No corrosion | No corrosion | No corrosion | Marked corrosion |
| 150°C × 48 hours | | | | |
| 150°C × 96 hours | — | — | — | — |

TABLE 3 — Continued

| | Run No. | | | |
|---|---|---|---|---|
| | 15 | 16 | 17 | 18 (Referential Example) |
| [Physical properties of the vulcanization product obtained by vulcanization at 155°C. for 30 minutes] | | | | |
| Mold releasing | Excellent | Excellent | Excellent | Good |
| Tensile strength (Kg/cm²) | 124 | 117 | 126 | 128 |
| 300% modulus (Kg/cm²) | 79 | 66 | 77 | 79 |
| Elongation (%) | 570 | 630 | 590 | 590 |
| Hardness (JIS) | 63–59 | 63–59 | 63–55 | 53–59 |

* An unvulcanized rubber blend is held between two stainless steel plates (SAE 1020), and clamped with a bolt. It is then heated in an oven, and withdrawn after a lapse of a predetermined time. The surface of the plate which has been in contact with the rubber blend is wiped with dilute hydrochloric acid, and then washed with toluene. The corrosion of that surface is examined with the naked eye.

EXAMPLE 5

Rubber blends were prepared in the same way as set forth in Example 1 using the ingredients shown in Table 4. The resulting blends were tested as to corrosive attack on metal. The blends were then vulcanized at 155°C. for 30 minutes, and the physical properties of the resulting vulcanization products were measured. The results obtained are shown in Table 4. In the permanent compression set test, the vulcanization product was heated at 150°C. for 4 hours before the test.

TABLE 4

| | Run No. | | | |
|---|---|---|---|---|
| | 19 | 20 | 21 | 22 (Referential Example) |
| [Compounding ingredients, parts by weight] | | | | |
| Epichlorohydrin polymer rubber (Hydrin 100) | 100 | 100 | 100 | 100 |
| Tin stearate | 2 | 2 | 2 | 2 |
| FEF carbon black | 40 | 40 | 40 | 40 |
| Phenyl-beta-napthylamine | 1 | 1 | 1 | 1 |
| Lead cyanate | 3 | 3 | 3 | — |
| Sorbitol | 3 | 3 | 3 | — |
| 2-Mercaptoimidazoline | — | — | — | 1.5 |
| Red lead | 5 | — | 5 | 5 |
| Magnesia | — | 5 | 5 | — |
| [Corrosive Attack on Metal]* | | | | |
| 150°C × 120 hours | 0 | 0 | 0 | 5 |
| 150°C × 195 hours | 0 | 0 | 0 | 5 |
| [Physical properties of the vulcanization product] | | | | |
| Tensile strength (Kg/cm²) | 124 | 124 | 123 | 141 |
| 300 % modulus (Kg/cm²) | 61 | 75 | 72 | 120 |
| Elongation (%) | 820 | 700 | 700 | 450 |
| Hardness (JIS) | 63 | 63 | 63 | 67 |
| Tensile strength (Kg/cm²) after aged at 150°C. in a gear oven | | | | |
| For 6 days | 73 | — | — | 58 |
| For 14 days | 56 | 13 | — | 15 |
| Permanent compression set (%) 150°C × 70 hours ×25 % compression | 73.5 | 62.0 | 53.0 | 81.4 |

* The test was conducted in the same way as in Example 4. The results were evaluated on a scale of 0 to 5, in which 0 indicates no occurrence of corrosion, and 5 indicates the occurrene of corrosion all over the surface.

It is clear from Table 4 that the compositions of this invention have no corrosive attack on metal, and the vulcanization products thereof have excellent thermal stability and low permanent compression set. The results obtained by using the conventional vulcanization agent (Run No. 22) are inferior to those obtained by using the vulcanization agents of this invention.

EXAMPLE 6

The procedure of Example 5 was repeated except that the compounding recipe shown in Table 5 was used. The corrosive attack on metal of the resulting compositions and the vulcanization properties thereof were tested. The results are given in Table 5.

TABLE 5

| | Run No. | | |
|---|---|---|---|
| | 23 | 24 | 25 (Referential Example) |
| [Compounding-ingredients, parts by weight] | | | |
| Epichlorohydrin-ethylene oxide copolymer rubber* | 100 | 100 | 100 |
| Tin stearate | 2 | 2 | 2 |
| FEF carbon black | 40 | 40 | 40 |
| 2,2'-Methylene-bis-(4-methyl-6-tert.-butyl phenol) | 1 | 1 | 1 |
| Lead cyanate | 3 | 3 | — |
| Sorbitol | 3 | 3 | — |
| 2-Mercaptoimidazoline | — | — | 1.5 |
| Red lead | — | — | 5 |
| Magnesia | 5 | 5 | — |
| 2-Mercaptobenzimidazole | — | 0.5 | — |
| [Corrosive Attack on Metal**] | | | |
| 150°C. × 48 hours | 0 | 0 | 0 |
| 150°C. × 120 hours | 0 | 0 | 3 |
| 150°C. × 168 hours | 2 | 0 | 5 |
| 150°C. × 216 hours | 2 | 0 | 5 |
| [Physical properties of the vulcanized product] | | | |
| Tensile strength (Kg/cm²) | 128 | 126 | 124 |
| 300 % Modulus (Kg/cm²) | 93 | 86 | 112 |
| Elongation (%) | 560 | 600 | 360 |
| Hardness (JIS) | 67 | 69 | 71 |
| Permanent compression set (%) 150°C.× 70 hours × 25 % compression | 56.2 | 64.2 | 68.0 |

* Hydrin 200 (tradename, B. F. Goodrich Co.)
** Evaluated on a scale of 0 to 5 as mentioned before.

It is seen from Table 5 that the compositions of this invention have a lesser corrosive attack on metal than the composition containing the conventional vulcanization agent, and give vulcanization products having a low permanent compression set and an equal tensile strength as compared with the composition containing the conventional vulcanization agent.

What we claim is:

1. A vulcanizable epihalohydrin polymer elastomer comprising (1) an epihalhydrin polymer elastomer, (2) at least one metal cyanate selected from the group consisting of cyanates of metals of Groups IA, IB, IIA, IIB and IVB of the periodic table, and (3) a functional compound selected from the group consisting of (i) compounds obtained by substituting at least two hydroxyl groups or mercapto groups for hydrogen atoms in a saturated hydrocarbon molecule, (ii) compounds obtained by substituting at least one hydroxyl group and at least one mercapto group for hydrogen atoms in a saturated hydrocarbon molecule, and (iii) compounds obtained by substituting at least one hydroxyl group or mercapto group or at least one hydroxyl group and mercapto group and one amino or imino group for hydrogen atoms in a saturated hydrocarbon molecule.

2. The composition of claim 1, wherein said epihalohydrin polymer elastomer is an epichlorohydrin homopolymer rubber or an epichlorohydrin-ethylene oxide copolymer rubber.

3. The composition of claim 1, wherein said metal cyanate is sodium cyanate, potassium cyanate, or lead cyanate.

4. The composition of claim 1, wherein said functional compound is a compound having 2 to 6 hydroxyl groups in the molecule.

5. A process for vulcanizing an epihalohydrin polymer elastomer, which comprises heating the epihalohydrin polymer elastomer at a temperature of about 120° to 180°C. in the presence of at least one metal cyanate selected from the group consisting of cyanates of metals of Groups IA, IB, IIA, IIB and IVB of the periodic table, and a functional compound selected from the group consisting of (i) compounds obtained by substituting at least two hydroxyl groups or mercapto groups for hydrogen atoms in a saturated hydrocarbon molecule, (ii) compounds obtained by substituting at least one hydroxyl group and at least one mercapto group for hydrogen atoms in a saturated hydrocarbon molecule, and (iii) compounds obtained by substituting at least one hydroxyl group or mercapto group or at least one hydroxyl group and mercapto group and one amino or imino group for hydrogen atoms in a saturated hydrocarbon molecule.

6. A vulcanizable epihalohydrin polymer elastomer comprising (1) an epihalohydrin polymer elastomer, (2) at least one metal cyanate selected from the group consisting of cyanates of metals of Groups IA, IB, IIA, IIB and IVB of the periodic table, (3) a functional compound selected from the group consisting of (i) compounds obtained by substituting at least two hydroxyl groups or mercapto groups for hydrogen atoms in a saturated hydrocarbon molecule, (ii) compounds obtained by substituting at least one hydroxyl group and at least one mercapto group for hydrogen atoms in a saturated hydrocarbon molecule, and (iii) compounds obtained by substituting at least one hydroxyl group or mercapto group or at least one hydroxyl group and mercapto group and one amino or imino group for hydrogen atoms in a saturated hydrocarbon molecule, and (4) at least one metal oxide selected from the group consisting of the oxides of metal of Groups IIB and IVB of the periodic table.

7. The composition of claim 6, wherein said epihalohydrin polymer elastomer is an epichlorohydrin homopolymer rubber or an epichlorohydrin-ethylene oxide copolymer rubber.

8. The composition of claim 6, wherein said metal cyanate is sodium cyanate, potassium cyanate, or lead cyanate.

9. The composition of claim 6, wherein said functional compound is a compound having 2 to 6 hydroxyl groups in the molecule.

10. The composition of claim 6, wherein said metal oxide is magnesia or red lead.

11. A process for vulcanizing an epihalohydrin polymer elastomer, which comprises heating the epihalohydrin polymer elastomer at a temperature of about 120° to 180°C. in the presence of at least one metal cyanate selected from the group consisting of cyanates of metals of Groups IA, IB, IIA, IIB and IVB of the periodic table, a functional compound selected from the group consisting of (i) compounds obtained by substituting at least two hydroxyl groups or mercapto groups for hydrogen atoms in a saturated hydrocarbon molecule, (ii) compounds obtained by substituting at least one hydroxyl group and at least one mercapto group for hydrogen atoms in a saturated hydrocarbon molecule, and (iii) compounds obtained by substituting at least one hydroxyl group or mercapto group or at least one hydroxyl group and mercapto group and one amino or imino group for hydrogen atoms in a saturated hydrocarbon molecule, and (4) at least one metal oxide selected from the group consisting of the oxides of metal of Groups IIB and IVB of the periodic table.

* * * * *

UNITED STATES PATENT OFFICE
CERTIFICATE OF CORRECTION

Patent No. 3,755,207             Dated August 28, 1973

Inventor(s) Tetsuo KARATSU

It is certified that error appears in the above-identified patent and that said Letters Patent are hereby corrected as shown below:

In the Heading: insert --Claims priority, application Japan, 10580/71, March 3, 1971--

Signed and sealed this 1st day of January 1974.

(SEAL)
Attest:

EDWARD M. FLETCHER, JR.                RENE D. TEGTMEYER
Attesting Officer                       Acting Commissioner of Patents